(No Model.) 3 Sheets—Sheet 1.

G. RACE.
PROCESS OF AND APPARATUS FOR PURIFYING GREASE.

No. 446,117. Patented Feb. 10, 1891.

Witnesses
Jas. R. McCathran
Wm. Bagger

By his Attorneys,
C. A. Snow & Co.

Inventor
George Race

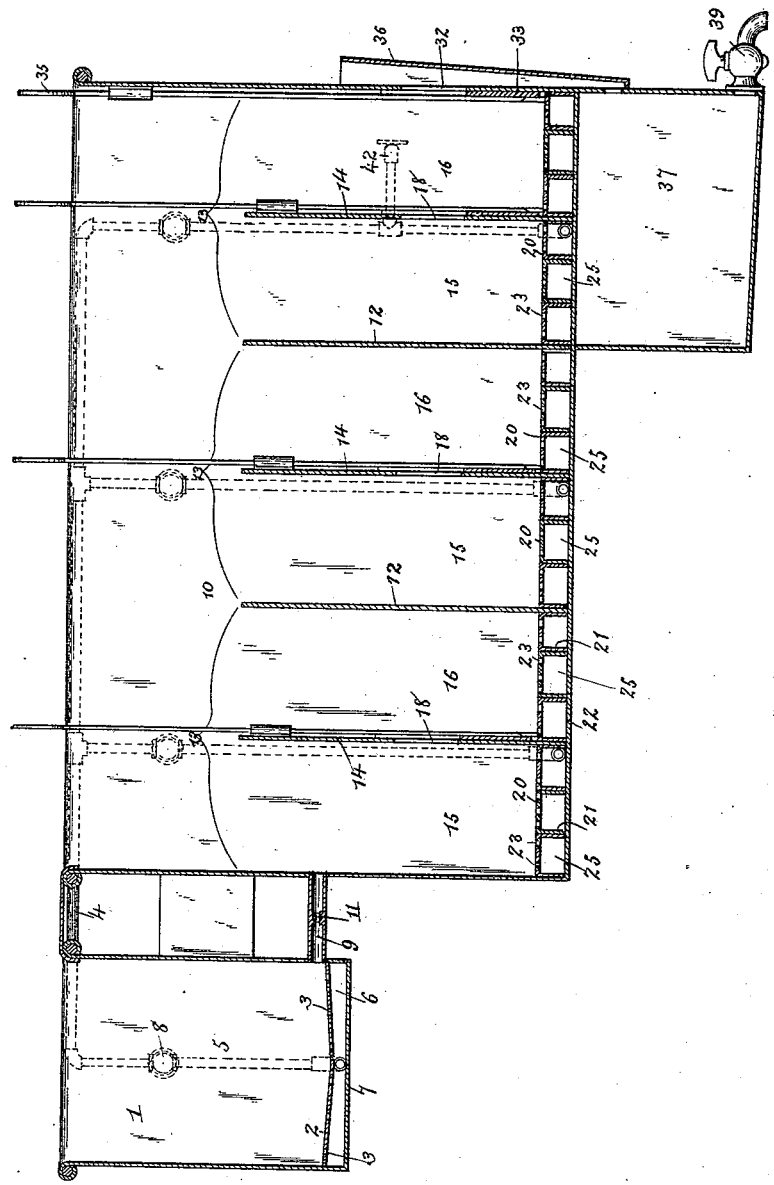

(No Model.) 3 Sheets—Sheet 3.
G. RACE.
PROCESS OF AND APPARATUS FOR PURIFYING GREASE.
No. 446,117. Patented Feb. 10, 1891.
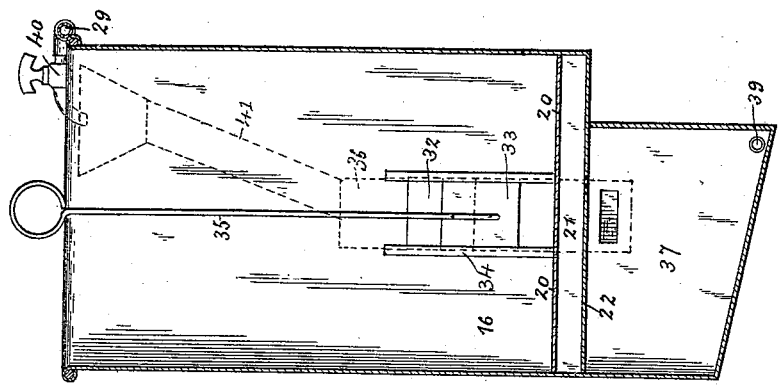
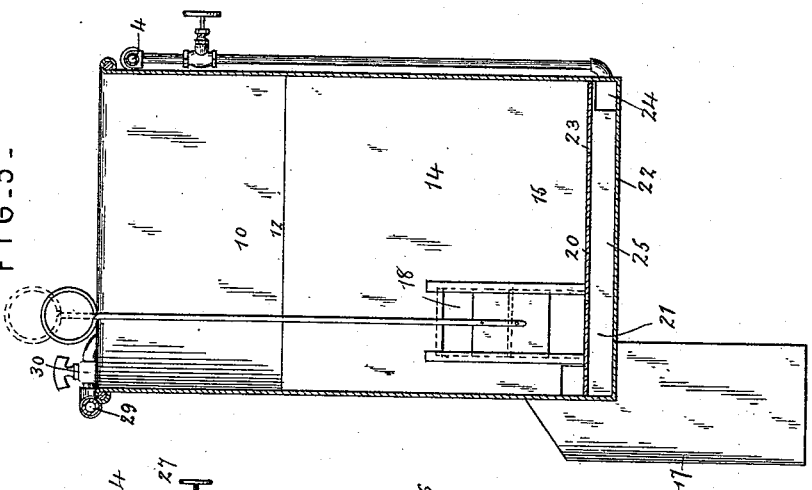
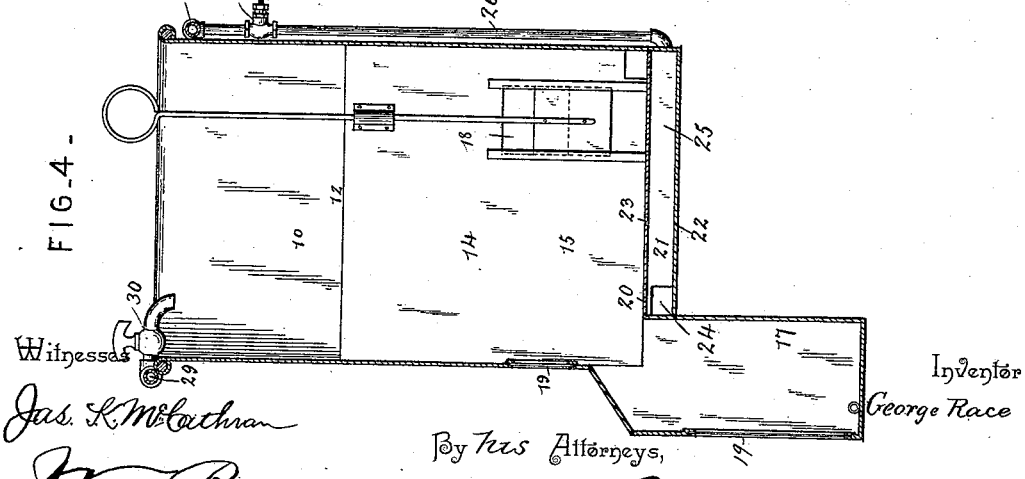

UNITED STATES PATENT OFFICE.

GEORGE RACE, OF NORWICH, NEW YORK.

PROCESS OF AND APPARATUS FOR PURIFYING GREASE.

SPECIFICATION forming part of Letters Patent No. 446,117, dated February 10, 1891.

Application filed May 13, 1890. Serial No. 351,607. (No model.)

*To all whom it may concern:*

Be it known that I, GEORGE RACE, a citizen of the United States, residing at Norwich, in the county of Chenango and State of New York, have invented a new and useful Apparatus for and Process of Purifying Grease, of which the following is a specification.

This invention has relation to an improved apparatus and process for purifying grease, such as butter, lard, oil, and the like; and it has for its object to construct an apparatus for this purpose which shall be simple, easily manipulated, and efficient in operation.

The invention, with these ends in view, consists in the improved construction, arrangement, and combination of parts, which will be hereinafter fully described, and particularly pointed out in the claims.

Figure 1:
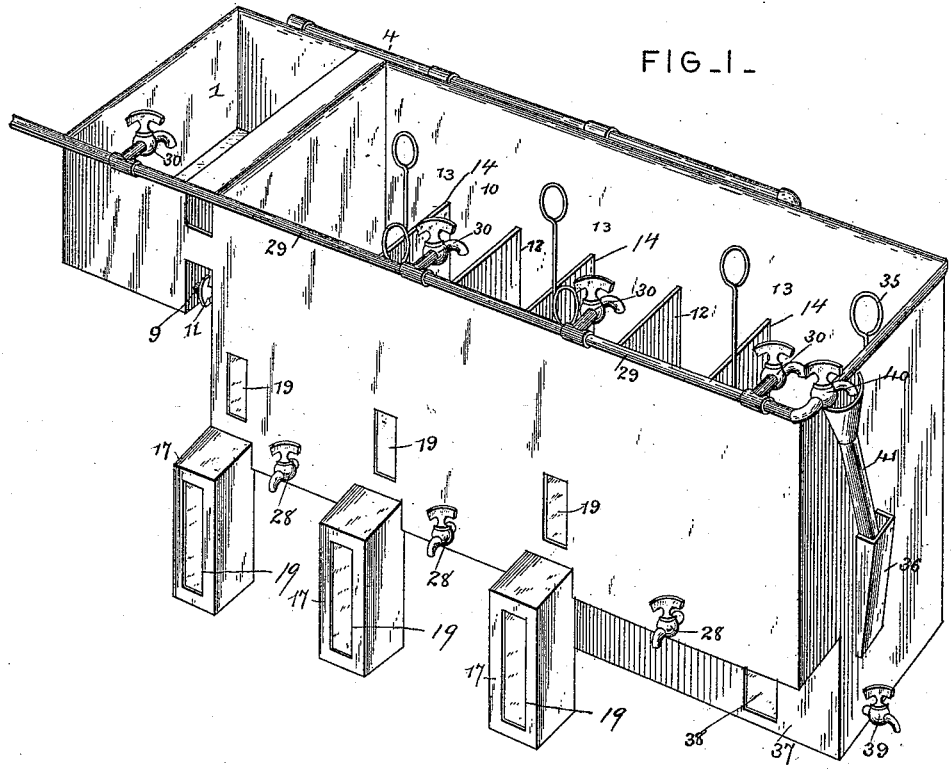
Figure 3:
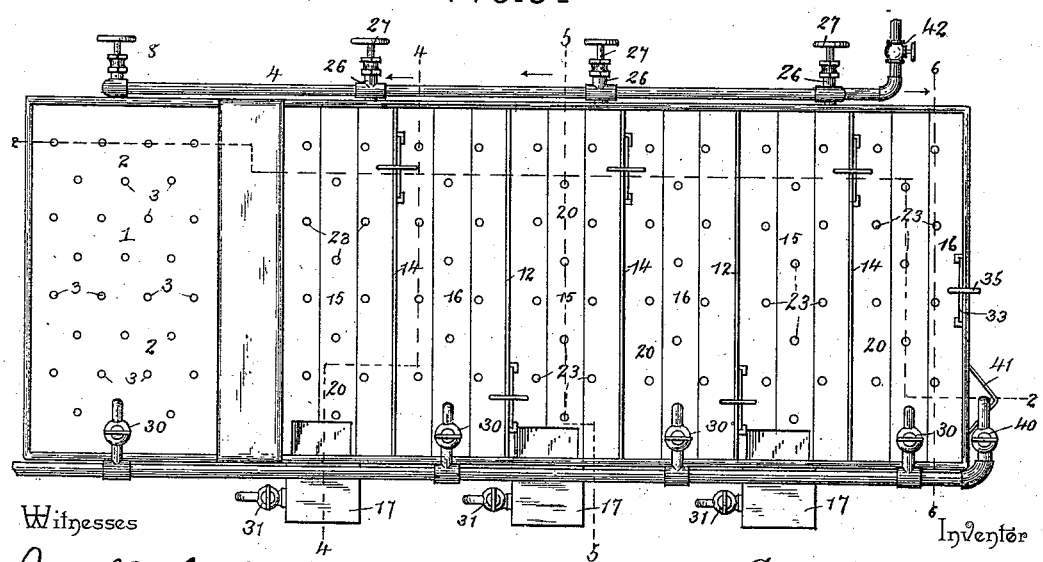

In the drawings hereto annexed, Figure 1 is a perspective view of an apparatus embodying my invention. Fig. 2 is a longitudinal sectional view of the same, taken on the line 2 2 in Fig. 3. Fig. 3 is a plan view. Fig. 4 is a transverse sectional view taken on the line 4 4 in Fig. 3. Fig. 5 is a transverse sectional view taken on the line 5 5 in Fig. 3. Fig. 6 is a transverse sectional view taken on the line 6 6 in Fig. 3.

Like numerals of reference indicate like parts in all the figures.

My improved apparatus may be described as being subdivided into three separate compartments, one of which is for the reception of the material which is to be purified. The second one is the purifying-compartment and the third receives the material after being purified.

The first compartment 1 is simply a vessel or receptacle of suitable size having a double bottom, the top plate of which 2 is provided with numerous perforations 3. 4 designates the steam-supply pipe, which is connected by a branch 5 with the space 6 between the perforated bottom plate 2 and the bottom plate 7 of the compartment 1. The branch pipe 5 has a valve 8, by means of which the flow of steam into the compartment 6 may be regulated. This is for the purpose of reducing the material placed in the receptacle 1 to a fluid state and to some extent for the purpose of heating it, so that it will readily flow through a pipe 9 from the receptacle 1 into the purifying-compartment 10. The pipe 9 has a cock or valve 11, by means of which the flow of the material which is to be purified may be regulated.

The purifying-compartment 10 is subdivided by means of vertical partitions 12 into sub-compartments, each of which is designated by 13. Of these sub-compartments there may be any desired number. In the drawings hereto annexed three have been shown, and this will usually be found sufficient. Each of the sub-compartments 13 is divided by a vertical partition 14 into chambers 15 and 16, the former of which is provided with a well 17, which may be of any desired depth, and which is preferably projected from the front wall, as will be seen in the drawings, for purposes to be hereinafter set forth. Each of the partitions 12 and 14 is provided at a suitable distance from the bottom of the chambers with an opening 18, forming an overflow through which the material may pass from one end of the purifying-compartment to the other. The openings 18 are located alternately at the front and rear ends of the partitions, the openings in the partitions 14 being adjacent to the rear wall of the compartment, while those in the partitions 12 are adjacent or contiguous to the front wall. The front walls of the compartments 15, as well as the front walls of the wells 17, have slots or openings 19, which are covered with transparent material, through which the state of the contents may at all times be observed. I prefer to use mica for covering the slots or openings 19, as being able to resist the heat to which it will necessarily be subjected. The bottom of the purifying-compartment, like the bottom of the receiving-compartment 1, is double, and is preferably constructed of a series of plates or strips 20, provided at their edges with downward-extending flanges 21, which are soldered or otherwise secured to the bottom 22 of the compartment. The strips or plates 20 are provided with perforations 23, and the flanges 21 are provided with registering openings 24, whereby all of the chambers or compartments 25 formed by the said flanged strips or plates are connected. The bottom chambers under each of the sub-compartments 13 should, however, be made separate from each other.

Branch steam-pipes 26, having regulating-valves 27, connect the steam-supply pipe 4 with the bottom chamber under each of the sub-compartments 13 for the supply of steam thereto. The peculiar construction of the bottom herein described is for the purpose of preventing the bottom from being injured by the pressure of steam to which it will necessarily be subjected, and which, if it were not for the strengthening-braces which are formed by the flanges 21, would have a tendency to bulge and eventually tear the bottom. Each of the bottom compartments under the sub-compartments 13 is provided with a drip-cock 28, through which the condensed water may be drawn off.

29 designates a water-supply pipe, which is provided with faucets 30, preferably located directly over the receiving-compartment 1 and over each of the chambers 16 for the purpose of supplying pure hot or cold water to the said compartments. Each of the wells 17 is provided at its lower end with a cock 31, through which the impure water may be drawn off. The wall of the chamber 16 of the last sub-compartment 13, meaning the one which is most distant from the receiving-compartment 1, is provided with an opening 32.

33 is a gate, which is arranged to slide between flanges 34, adjacent to the opening 32 and extending below the latter. The gate 33 has an operating-rod 35, by means of which it may be manipulated to regulate the height at which the contents of the chamber 16 shall be permitted to overflow, or by means of which the said gate, when desired, may be entirely closed.

36 is a funnel or hopper arranged to receive the overflow through the opening 32 and to conduct it to the cooling-chamber 37. The latter is provided with an opening 38, covered with glass or mica to enable the state of its contents to be observed, and it has a cock 39, through which its contents may be drawn out. The water-supply pipe 29 has a faucet 40, arranged above a pipe 41, which serves to convey water to the funnel or hopper 36 to assist in cooling the purified material. The branch pipe 26, which connects the steam-pipe with the bottom compartment of the last sub-compartment 13, is connected with a valved pipe 42, as shown in Fig. 3, through which when the steam-supply is shut off air may be forced by suitable mechanism through the contents of the last sub-compartment 13 for the purpose of granulating or restoring the grain to the material.

The operation of my invention is as follows: The material which is to be purified is placed in the compartment 1, and steam is admitted into the chamber 6, from whence it escapes through the perforations 3 and through the contents of the receptacle, reducing said contents to a liquid state. The material now passes through the pipe 9 into the chamber 15 of the first sub-compartment 13 of the purifying-compartment 10. Water is at the same time admitted into the several compartments 16 from the supply-pipe and steam to the bottom compartments of each sub-compartment. The material which is to be purified will pass through the openings 18 from one chamber and sub-compartment to the other until it reaches the last sub-compartment. The water will preferably flow in the opposite direction from each chamber 16 into the adjacent chamber 15, but it will flow no farther, because it is constantly being drained off through the cocks 31 at the lower ends of the wells 17. At the same time the steam is forced through the perforations 23 in numerous small jets through the water and grease contained in the several sub-compartments, thoroughly agitating the contents, causing the water to thoroughly wash and remove all impurities from the grease and carrying off the bad odors as they escape. The material may be caused to remain in the purifying-compartment for any desired length of time before it is permitted to escape through the opening 32 to the cooling-compartment, or in case it shall be desired to make the process continuous the material may be permitted to escape continually in any desired quantity and at any desired height, which may be regulated by means of a gate 33. In the first sub-compartment 13 the material which is to be purified will be relieved from the coarsest impurities and will be in a comparatively clean state when it enters the second sub-compartment, where the operation of purification is practically completed, so that on entering the third sub-compartment it is practically pure and sweet, the said third sub-compartment being for the purpose of subjecting it to a thorough rinsing. I usually find that the water which is drawn off from the well of the third sub-compartment is perfectly sweet, proving that the material with which it has been in contact has been thoroughly purified. For the purpose of restoring the grain to the butter, (when butter is the material that is operated upon,) I prefer, in lieu of steam, to force a blast of air through the contents of the last sub-compartment. When the material that has been operated upon leaves the last sub-compartment, it enters the cooling-compartment 37, where it may be permitted to remain any desired length of time before it is finally drawn off through the cock 39.

By my improved apparatus rancid and impure grease of all kinds may be very quickly and thoroughly purified, greatly increasing its value. It will be particularly observed that the purifying-vessel is open for the escape of the steam which passes through the material to be purified, thus permitting all volatile impurities to escape, which would be practically impossible if the process were carried on in a closed vessel. It will also be observed that the water contained in each sub-compartment is not permitted to pass into the adjacent ones, thus enabling the material to be subjected, as it were, to a series of separate washings while it passes through the purifying-compartment, and thus preventing impurities from passing with the water from one compartment to the other. The wells into which the impure water of each sub-compartment settles, being projected from the front wall of the apparatus, as described, are removed as far as possible from the most violently agitated part of the contents, thus enabling the water to settle thoroughly and to be drawn off without danger of any of the grease escaping with it.

I prefer to provide each of the dams or openings 18 with a gate constructed like the gate 32, in order that the overflow of material may be perfectly controlled and regulated. The state of the contents of each sub-compartment may at all times be ascertained through the sight-panes 19, thus enabling the supply, as well as the outflow, of the water to be perfectly regulated.

One of the advantages of my improved process and apparatus is this, that I have found that the grease which is subjected to my improved process is not only thoroughly purified, but is thoroughly freed from any germs of disease with which it may have become impregnated, whether caused by the use of impure milk in the manufacture of butter or by other causes. This I consider to be due to the fact that the grease is floated over water running in an opposite direction, so that the grease as it becomes gradually purified is acted upon by purer water, the supply of pure water taking place at the point where the process of purification is practically terminated. The purified grease is therefore not exposed to contact with contaminated water, and the result is that the grease at the termination of the process will be perfectly pure and wholesome.

While the compartment 1 has been described as being simply a receiving-tank, in which the material to be operated upon is reduced to a liquid state, it will be understood that the steam and water to the action of which the material is subjected while it remains in this tank will have the effect of removing a considerable portion of the impurities that may be contained therein.

Having thus described my invention, I claim and desire to secure by Letters Patent—

1. A process of purifying grease, which consists in floating it while in a liquid state over a current or currents of water running in the opposite direction and forcing successively jets of steam and air through the water and liquid grease, substantially as and for the purpose set forth.

2. In an apparatus for purifying grease, the purifying-compartment having the sub-compartments, each divided by a vertical partition into two separate chambers, one of which is provided with a well or sink, all of said compartments being provided with bottom chambers having perforated top plates, in combination with means for supplying steam to the said bottom chamber and water to the chamber of each sub-compartment which is not provided with a well, the several separating-partitions being provided with openings for the passage of the material to be purified and water, substantially as set forth.

3. In an apparatus for purifying grease, the purifying-compartment having partitions and an end wall provided with openings for the passage or overflow of its contents, said openings being arranged at a distance above the bottom, in combination with the gates arranged to slide between flanges extending below said openings to permit the contents to flow through said openings over the upper edges of the gates, substantially as set forth.

4. In a device of the class described, the tank or purifying-compartment having a bottom compartment composed of a series of perforated strips or plates suitably connected and having downward-extending flanges secured to the bottom plate of the tank, said flanges being provided with openings registering with each other, and the valved pipes for supplying steam under pressure to the said bottom compartment, substantially as set forth.

5. In an apparatus for purifying grease, the combination, with the purifying-compartment having a series of sub-compartments, of the settling wells or sinks projected from the front wall of each sub-compartment, substantially as set forth.

6. In an apparatus for purifying grease, the sub-compartments having bottom chambers with perforated top plates and valved steam-supply pipes, in combination with the settling wells or sinks projected from the front walls of said sub-compartments, substantially as set forth.

7. In an apparatus for purifying grease, the combination of the receiving-tank, the purifying-compartment, and the cooling-tank, said purifying-tank being subdivided as herein described, the settling wells or sinks in one of the chambers of each sub-compartment, means for supplying water to the other chamber of each sub-compartment, bottom-chambers arranged under each sub-compartment and having perforated top plates, means for supplying steam under pressure to the bottom chamber of each sub-compartment, and means whereby air under pressure can be forced into the bottom chamber of the last sub-compartment or the one most distant from the receiving-tank, substantially as and for the purpose herein set forth.

In testimony that I claim the foregoing as my own I have hereto affixed my signature in presence of two witnesses.

GEORGE RACE.

Witnesses:
J. H. SIGGERS,
R. W. DAYTON.